US006996520B2

(12) United States Patent
Levin

(10) Patent No.: US 6,996,520 B2
(45) Date of Patent: Feb. 7, 2006

(54) LANGUAGE TRANSLATION SYSTEM AND METHOD USING SPECIALIZED DICTIONARIES

(75) Inventor: Robert E. Levin, New York, NY (US)

(73) Assignee: Transclick, Inc., New York, NY (US)

( * ) Notice: Subject to any disclaimer, the term of this patent is extended or adjusted under 35 U.S.C. 154(b) by 0 days.

(21) Appl. No.: 10/714,035

(22) Filed: Nov. 14, 2003

(65) Prior Publication Data

US 2004/0102956 A1 May 27, 2004

Related U.S. Application Data

(60) Provisional application No. 60/428,547, filed on Nov. 22, 2002.

(51) Int. Cl.
*G06F 17/28* (2006.01)

(52) U.S. Cl. ............................................ 704/10; 704/9

(58) Field of Classification Search .................... 704/2, 704/3, 9, 10

See application file for complete search history.

(56) References Cited

U.S. PATENT DOCUMENTS

| | | | | |
|---|---|---|---|---|
| 5,535,120 A * | 7/1996 | Chong et al. | .................. | 704/3 |
| 5,587,902 A * | 12/1996 | Kugimiya | ...................... | 704/2 |
| 5,701,497 A * | 12/1997 | Yamauchi et al. | ............. | 704/3 |
| 5,987,402 A * | 11/1999 | Murata et al. | ................. | 704/2 |
| 6,389,387 B1 * | 5/2002 | Poznanski et al. | ............. | 704/9 |

* cited by examiner

*Primary Examiner*—Susan McFadden
(74) *Attorney, Agent, or Firm*—Williams Mullen; Thomas F. Bergert

(57) ABSTRACT

A system and method for translation of electronic communications automatically selects and deploys specialized dictionaries based upon context recognition and other factors. Software tools can be employed for continual dictionary enhancement. The invention can accept speech and text inputs and can be used to translate electronic mail, instant messages, chat, SMS messages, electronic text and word processing files, Internet web pages, Internet search results, and other textual communications for a variety of device types, including wireless devices. In one embodiment, language pairs are automatically determined in real-time.

35 Claims, 9 Drawing Sheets

LANGUAGE TRANSLATION SYSTEM AND METHOD USING SPECIALIZED DICTIONARIES

REFERENCE TO RELATED APPLICATIONS

This application claims the benefit of U.S. provisional patent application Ser. No. 60/428,547, filed Nov. 22, 2002 and entitled "Language Translation System And Method", the disclosure of which is incorporated herein by reference.

TECHNICAL FIELD

The present invention relates to multilingual communications over a computer network, and more particularly, to a system and method for improved language translation and delivery of textual portions of communications sent over a computer network.

BACKGROUND OF THE INVENTION

Language translation is the transfer of the meaning of a text from one language to another for readership. Language translation methods have evolved over the years and vary from traditional human translation to machine translation to machine translation with a human translation component. Various pre- and post-translation editing techniques have also been employed to increase the accuracy of translated text. Human translators use a variety of thought processes, skills and resources to interpret the meaning of a sentence and communicate the meaning of that sentence in a different language. They are expert at the proper grammar, idiomatic turn of phrase, and specialty vocabulary areas, which ensures a translation that will be clearly understood in the target language. Understandably, the automation of this human process has proven to be challenging and costly, and to date the publication of translated documents often requires the involvement of a human translator acting as an editor.

With the advent of networked computers and the Internet, and the resulting cheap, instant global messaging, information retrieval, and file transfer capabilities, the need for improved, automated, and highly accurate translation capabilities is greater than ever. While human translation is unquestionably the preferred method for producing accurate and idiomatic translations, it remains prohibitively expensive and too time consuming to meet the new demands of businesses and individuals working at Internet speeds. Today, multinational corporations are communicating with their international offices and partners on a daily basis. In order for organizations to continue to maintain a competitive edge, personnel must have the ability to collaborate with colleagues around the globe. Successful partnerships with international colleagues require that personnel have access to immediate translations of foreign-language documents, intranet content, and cross-language communications via workgroups and e-mail.

Some Internet web sites allow a user to obtain a translation of a web page from one language into another, or allow the translation of a given textual matter from one language into another. Web sites such as www.altavista.com and its Babelfish™ program, for example, provide Internet access to machine translation tools which can translate text using one of the many methods of machine translation commonly known. Other systems, such as LanguageLine™ Services from AT&T™ provide fast voice translation services to assist with language translation needs via telephone. Unfortunately, such systems and/or web sites do not provide consistently accurate or context-related translations and are therefore not suitable for quickly and effectively translating broad ranges of communications.

Search engines are generally equally poor at translation. Search engines are not known to maintain databases in more than one language. If a user inputs keywords in the English language, the search engine will only search for web pages containing the English keywords. Therefore it is not likely that the search engine will discover web pages which contain the French translation of the input keywords, for example. Accordingly, in this example, although a web page drafted in the French language may be highly relevant to the English keywords and of particular interest to the user, the search engine is unlikely to detect the French web page. In addition, current search engines typically first return to the user abstracts or small portions of text from the web pages discovered during the search. If a web page happens to be in a foreign language, the abstract or text will be presented to the user in that foreign language. Accordingly, the user will not be able to understand the search results without retrieving the web pages and then translating the text. The quality of the search result can thereby suffer.

The language translation challenge is also significant in the context of e-mail and chat messages. Oftentimes, a user will desire to send a message to another party who is not fluent in the user's native language. Accordingly, the user will have to create the message in the native language, initiate some process for translating the message into the foreign language and then send the message to the other party. While software programs and Internet web sites exist for translating text from one language to another, such processes are burdensome to the user. The user's e-mail or chat applications must either be modified to include or configured to interface with translation software. The user is also required to take affirmative steps to ensure that the translation is performed prior to sending the message. This influences user interaction whether the message is in e-mail, instant message, short message service (SMS) or other format. Translation of SMS messages is particularly challenging given the myriad devices, operating systems, and networks involved in SMS messaging.

The present invention focuses on the development and improvement of machine translation efficiency, quality and accuracy.

It is thus one object of the present invention to provide a system for automatic translation of user defined communications in a computer network.

It is another object of the invention to provide improved language translation services to Internet users and remote device users while not requiring substantial modifications to the user's existing hardware or software.

It is another object of the present invention to provide highly accurate translations of textual communications through automated dictionary selection and deployment.

It is a further object of the present invention to provide a quick, efficient method for machine translation over a computer network whereby dictionaries can be continuously augmented and adjusted for more accurate communications.

It is yet another object of the present invention to provide a method and system for machine translation over a computer network which allows users to communicate in different languages in real-time using specialized dictionaries.

It is still another object of the present invention to provide a comprehensive, easy-to-access database of specialized dictionaries.

It is another object of the present invention to provide a system for performing machine translation for different source languages, target languages, and sublanguages, and automatically sending the translated text via telecommunications links to one or more recipients in different languages and/or in different locations.

It is still another object of the present invention to provide a system and method for enhanced levels of translation accuracy based on context recognition and sub-language dictionary application.

It is yet another object of the present invention to provide a system and method for text translation which is capable of being upgraded easily through subsequent dictionary inputs from users.

It is yet another object of the present invention to provide a system and method for accurate, real-time translation of various text messages, including SMS messages.

DISCLOSURE OF THE INVENTION

By the present invention, there is thus provided a system for translation of electronic communications that automatically selects and deploys specialized dictionaries based upon context recognition and other factors. The system includes a machine translation component which can access a database of specialized dictionaries and can also deploy search agents to search the Internet for complementary specialized translation dictionaries. Software tools can be employed to allow each dictionary to be modified, augmented, and supplemented to become more complete and accurate for a given contextually sensitive translation. The system and method of the invention can be used to translate electronic mail, instant messages, chat, SMS, electronic text and word processing files, Internet web pages, Internet search results, and other textual communications. The system can accept a wide variety of inputs converted to text, including facsimiles and speech inputs, and can translate based upon specialized sub-dictionaries, including user-specific dictionaries. In one aspect, a network of readily accessible dictionaries is provided whereby dictionary owners can be compensated for the use of their specialized dictionaries.

The present invention assists in both the assimilation of translated foreign-language information for one's own purposes, and the dissemination of translated native-language information for receipt by a foreign language individual. The present invention can employ comprehensive dictionaries and a collection of linguistic rules that translate one language into another without relying on human translators. The present invention can interpret the structure of sentences in the source language (the language the user is translating from) and generate a translation based on the rules of the target language (the language the user is translating to). The process involves breaking down complex and varying sentence structures, identifying parts of speech, resolving ambiguities, and synthesizing the information into the components and structure of the new language.

In one embodiment, the present invention combines machine translation with other communication and knowledge management tools in order to create the ability, in real-time, over a network to (1) convert Speech-to-text (STT) with the highest accuracy level and speed possible; (2) port the STT output to an open-architecture machine translation system using a larger range of both language-specific and context-specific lexicons; (3) identify changes in dynamic content for a real-time dictionary selection; and (4) represent the output as synthesized speech on any type of communication device.

The translation communication services of the present invention provide translation to standard services such as email, faxes and voicemail services over the Internet. For example, senders could write a fax or email in their native language, automatically translate it and do post editing before sending.

According to one aspect, the present invention includes an SMS message routing component that transmits and receives short message service (SMS) data packets via a communications network. The routing component includes an SMS message translation database that contains information used to determine the translation for a received SMS message. The message translation database includes data used to identify a sending and/or receiving party attribute of an SMS message, as well as translation processing instructions. Such translation processing instructions can include context-specific translation instructions. In one aspect, the present invention can provide an SMS translation component readily accessible regardless of device type, network operator or device operating system.

DETAILED DESCRIPTION OF A PREFERRED EMBODIMENT

Figure 1:
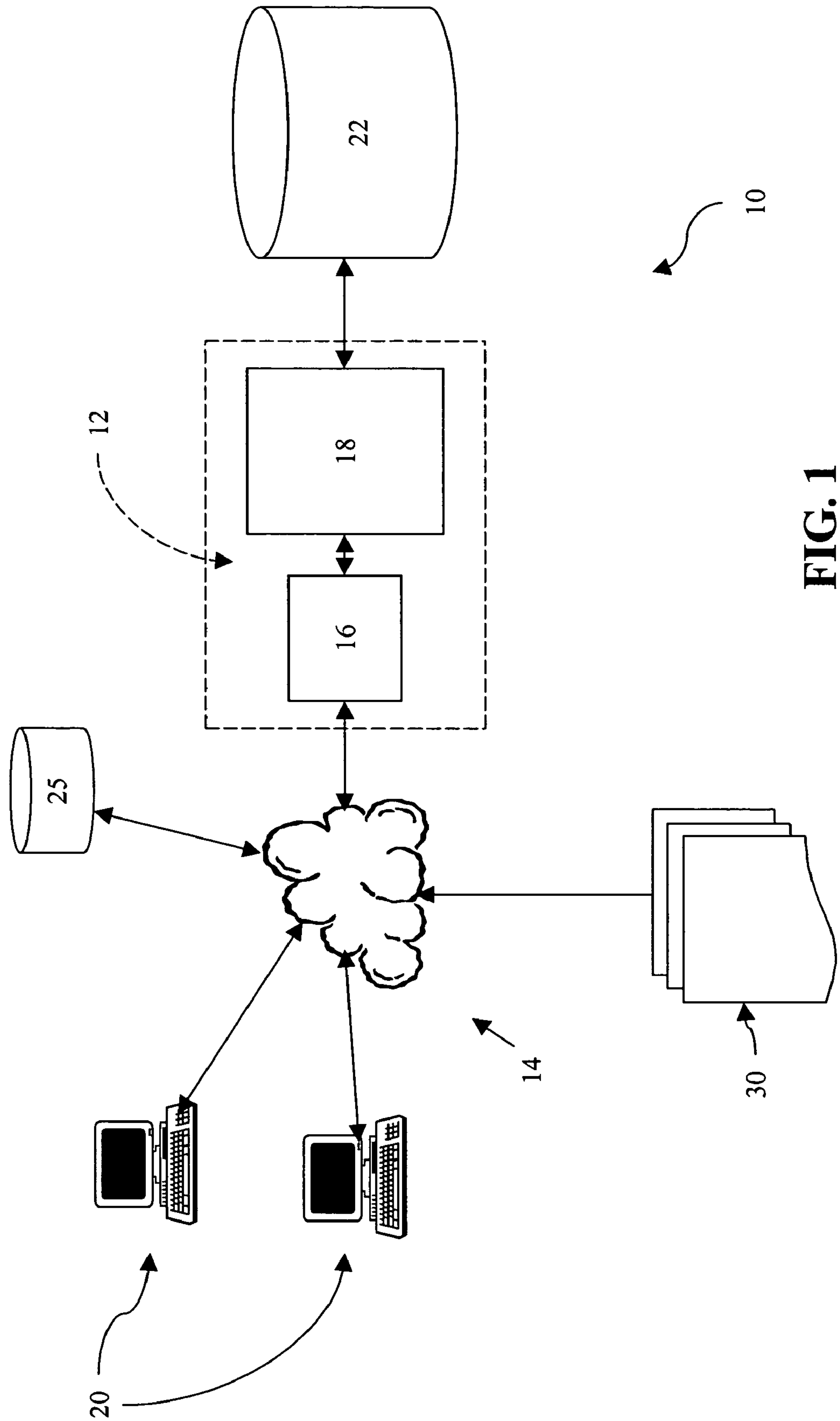
FIG. 1 is a functional block diagram of one environment in which the present invention may provide multilingual service capability across a computer network.

The present invention is directed to a system and method for performing language translation functions for communications over a computer network. As shown in FIG. 1, by the present invention there is provided a translation system 10 having a translation gateway 12 for receiving and translating communications sent over a computer network 14. In one embodiment of the invention, the computer network can be the Internet. The gateway 12 may be functionally separated into an interface server 16 and a translation server 18. The interface server 16 has the ability to receive a communication having a textual portion authored in a first language, such as may be transmitted from an end user device 20 such as a standard personal computer adapted with hardware and software to communicate over the network.

User 20 can be connected to the computer network by conventional means, such as a modem or direct connection through a local area network, wide area network, or other similar means. While connected, the end user device 20 and the interface server 16 can communicate via the Internet using standard communication protocols. In certain embodiments, the interface 16 may function in an OEM, or back-end, configuration, such as when an end user device 20 or a remote server comprises a search engine front-end. In such configurations, a custom communication protocol may be employed.

The end user devices 20 can also be equipped with application software that allows a user to interact with services offered over the network 14. For instance, the end user devices 20 may include standard browser software for receiving web pages over the Internet and for interpreting documents created in HTML. Also, the end user devices 20 may include other application software, such as electronic mail ("e-mail") applications, File Transfer Protocol ("FTP") applications and other file transfer applications, chat room applications, newsgroup applications, instant messaging applications, short message service (SMS) applications and the like, to interact with other services offered over the Internet or other network. Alternately, one or more of the end user devices 20 may be other search engines operating in cooperation with the interface server 16. For instance, the end user devices 20 may be search engine front-ends provided by other service providers and which pass information between an actual end user and the interface server 16.

The interface server 16 in accordance with one embodiment of the present invention includes the capability to provide the user with a seamless interface to resources of the Internet, which may happen to exist in many languages. In other words, the interface server 16, acting in conjunction with a translation server 18 includes the ability to translate information received from the user from a first language to a second language, and to translate information destined to the user from a second language to the first language. In addition, the interface server 16 and the translation server 18 provide translation services with minimum deviation from traditional methods of interfacing with Internet resources. In one aspect of the present invention, the interface server 16 is accessible via remote devices sending and receiving text and short message service (SMS) messages. The function of the interface server 16 and the translation server 18 are discussed in greater detail below.

The interface server 16 can forward a communication, or portions thereof, to the translation server 18. The translation server 18 translates the textual portion of the communication to another language. In one embodiment, the translation server 18 converts each word from the native language to the language identified as the target language, using syntactic and semantic analysis algorithms as known in the art. The interface server 16 then receives the translated textual portion from the translation server 18, constructs the translated communication, if necessary, based on the translated textual portion, and finishes processing the communication in the manner desired by the user 20. The communication may represent an e-mail message, a chat message, a keyword search request, a web-page (e.g., an HTML file), an SMS message, a URL, or any other transmission of data from one network node to another network node. Accordingly, the gateway may be responsible for translating and routing e-mail messages, SMS messages, chat messages, keywords and/or database queries, URLs, abstracts and other information pertaining to web pages, message communications, and other types of data files.

In one embodiment of the invention, the interface server 16 may include search engine functionality for transmitting database search queries to a search engine database 25. The Internet may connect the interface server 16 to the search engine database 25. Alternatively, a direct network connection may connect the interface server 16 to the search engine database 25. One example of the search engine database 25 is the Internet database maintained by the Inktomi Corporation, which is well known in the art. The search engine database 25 may include information referring to many hundreds of thousands, even millions, of web pages published on the Internet. Within the search engine database 25, information may associate a location of a data file with multiple keywords describing the content of the web page. The keywords stored in the search engine database 25 may be extracted from words present within each web page, such as text within the web page or text stored in "meta-tags" within the web page. As is well known in the art, meta-tags are portions of a web page which are not visible to a user, but which can contain text describing the web page. Generally, keywords are only stored within the search engine database 25 in one language—the native language of the web page. Consequently, keywords are only searchable in the search engine database 25 in the native language of the keywords. Thus, if keywords happen to be in the French or German language, the search engine database 25 should be queried in that language.

The interface server 16 can also include search engine functionality to conduct a search of the Internet or other network for translation dictionaries, or a search of a dictionary database 22 as part of the present invention, described hereinafter.

Machine Translation using Specialized Dictionaries

Figure 2:
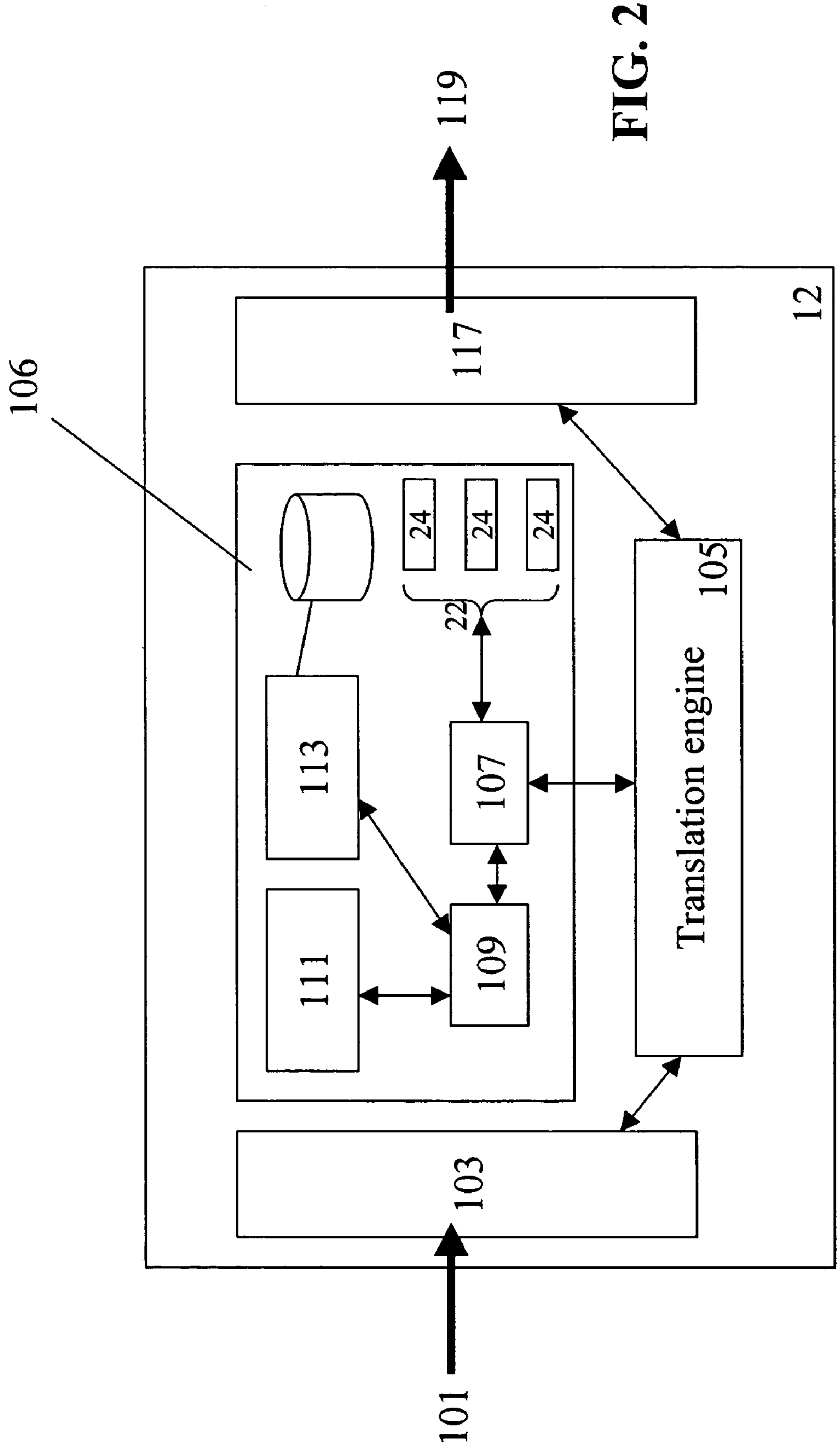
FIG. 2 is a block diagram of one aspect of the present invention, showing how a speech input can be converted to text, translated, converted back to speech and outputted using the translation system of the present invention.
Figure 3:
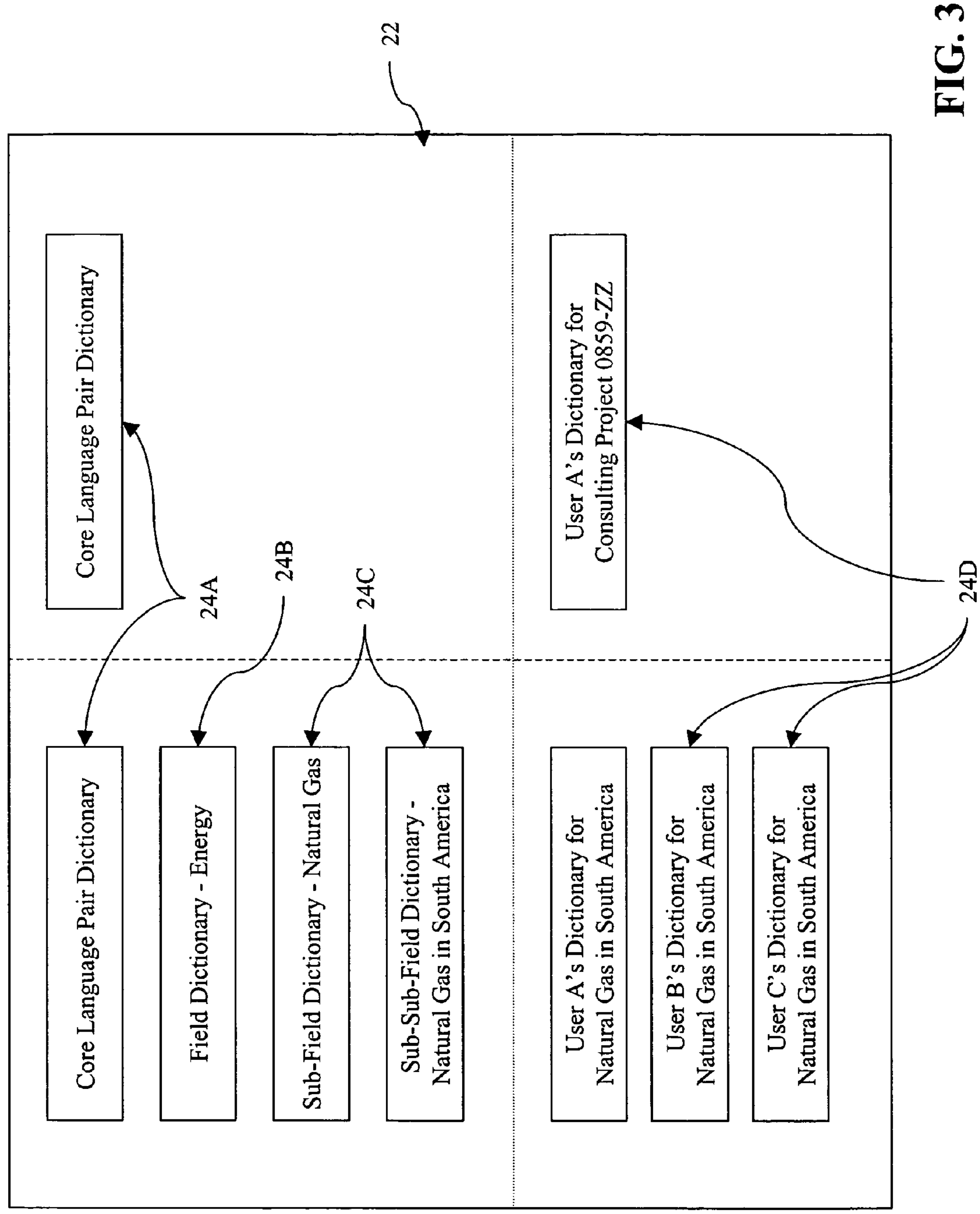
FIG. 3 shows an example of a portion of a dictionary database architecture for use in connection with the system and method of the present invention.

As shown in FIGS. 1 through 3, the machine translation system of the present invention also includes a dictionary database 22 capable of storing dictionaries 24 for a number of core language pairs 24A as well as for individual subject matter domains 24B, sub-domains or sub-languages 24C, and user-specific domains 24D. For purposes herein, a core language pair refers to the combination of (1) the language of the communication to be translated, or source language, and (2) the language into which the communication is to be translated, or the target language. For example, standard core dictionaries 24A may include English-to-French, German-to-Japanese, Korean-to-English, and many other possible combinations of language pair dictionaries and translation engines.

Each sub-language in the dictionary database is chosen to have a manageable size, predictable modes of expression and syntactic structures, and a well-understood context for disambiguation of homonyms, polysemic phrases, and specialized references. It should be noted that, in the machine translation field, the term "sub-language" usually refers to a recognized domain having a defined set of terms and patterns of language usage that characterize that domain. In the present invention, "sub-language" or "sub-domain" is used more loosely to refer to any set of terms and patterns of usage attributed to a field of usage, group of users, or even an individual user. A sub-language dictionary can thus be set up whenever a preferred set of terms and usages is identified. In addition to being set up by domain or field and sub-domain or sub-field, sub-language dictionaries can be set up corresponding to socially determined usages or particular contexts, for example, or for a given type of correspondence, such as business or social, for example.

As an example, within each language pair dictionary category, there may be domain and sub-domain dictionaries, such as investing and bonds, sports and soccer, home construction and plumbing, and music and classical, for example. Even further specified may be the user's own stored dictionary of terms or expressions and equivalent translated terms or expressions. Such a specific user dictionary may have value in a particular Internet discussion group, a work group, a collaboration team group, or other small unit requiring particular translation dictionaries not otherwise facilitated. User dictionaries need not be domain or sub-domain specific, and can be created by the user within the realm of a language pair dictionary, as shown in FIG. 3. In one embodiment of the present invention, all dictionaries (domain, sub-domain, and user) can be stored in the dictionary database 22 accessible by the translation server 18. Each of the dictionaries stored in the dictionary database can be built and stored using a prescribed format for ease of manipulation by the machine translation server.

Dictionary Building, Storing, and Enhancement

Sub-language dictionaries can be established and enhanced with dictionarybuilding tools currently used in machine translation, such as by using the ECS/MT™ system tools. The ECS/MT system allows the user to create a dictionary for a given language pair including technical terms for a chosen sub-language, and provides a rule editor, a dictionary maintenance utility, a translation module, a morphology module and a semantic preference component.

The rule editor allows a linguist to create and modify morphological rules, phrase structure rules, and transfer rules for the sub-language. The dictionary maintenance utility allows creation and modification of lexical entries, including source entries, target entries, and source-to-target transfer entries in the dictionary. The translation module performs table-driven translation using linguistic tables, analysis rules, transfer rules, and semantic preference entries that have been compiled into the dictionary. The morphology module applies rules to analyze morphologically complex words to determine uninflected forms for dictionary lookup of source lexical items and to generate morphologically complex words in the target language. The semantic preference component operates on preferred semantic relations, the assignment of semantic attributes to lexical items, and the accessibility and matching of these attributes for lexical disambiguation and selection of preferred translations.

In one embodiment of the present invention, the dictionary building tools can be accessed over the Internet using an Internet browser. In this way, users who may be qualified to add or modify a particular dictionary in the database 22 can augment and improve the accuracy of interpretations for the benefit of those subsequently using that dictionary. In one embodiment, access to dictionaries is controlled by a central registration authority which limits access to authorized individuals. In another embodiment, an application programming interface (API) is provided to allow users to interface with the dictionaries regardless of the computer system, hardware, or software being employed. The API's can be provided with libraries of tools commonly known in the art for building dictionaries. In this way, a particular sub-language's capability is developed and cumulated over time based upon the encountered words and identified preferences of actual users, user groups, domains, or fields. Thus, the dictionary building interface of the present invention can facilitate a peer-to-peer networking of specialized dictionary tool builders.

In certain instances, the dictionary database of the present invention will not present a specific sub-domain dictionary for a given topic or subject. In such cases, in one embodiment of the invention, the system of the present invention can provide search agents as part of the interface server 16 to search the Internet for such a dictionary, as shown generally at 30 in FIG. 1. The search agents may be employed in a manner similar to that commonly known within the art.

Sub-Domain Dictionary Search

Upon finding an appropriate dictionary 30 over the Internet or other network for the given request, the present invention can invoke a software interface to allow the machine translation server to communicate with and use the newly found dictionary, and to translate the desired text for delivery in accordance with the user's request. The interface can be a software routine, for example, which converts the format of the found dictionary 30 into a format which is readily understood by the translation server 18.

The system of the present invention can also store the interactions of each user in a user file, which can be recalled each time the particular user accesses the system. The system may recognize the user through a cookie or cookies left on the user's computer system when accessing the system of the invention via the Internet, for example, or the user may be recognized through the user providing identification information such as an e-mail address, account name, or password, for example. Such user information can be used to help predict which dictionary is most appropriate for the given user's request. The user file can be stored in a database accessible by the translation server. In one embodiment of the invention, user files can be stored in the dictionary database 22.

Machine Translation Method

The translation server 18 or engine may employ a conventional transfer-type system, an interlingua system, or other system of translation as is well known in the art of machine translation. By providing the machine translation server 18 with the most appropriate dictionary during the translation process as described herein, the method which is used to effectuate the machine translation is less consequential to the quality of the results.

Topic Detection and Context Recognition

In one aspect, the present invention provides a real time translation system employing topic detection and context recognition. Traditionally, real-time translation has some formidable obstacles, probably the greatest of which is word-sense disambiguation, and the related problem of translation divergences. Domain-specific lexicons, despite their quality and number, can only offer limited improvements in real-time machine translation (MT) quality if they cannot be accessed when needed. One advantage of the present invention is the ability of the system to automatically detect topic changes so that on-line domain-specific dictionaries can automatically be accessed in real-time.

Topic detection and tracking (TDT) can involve several tasks including segmenting text into its constituent stories, identifying original topics, and matching topics to those already identified (tracking). The segmentation task can be approached by a variety of techniques including Hidden Markov Models. Under this approach, identifying topics in a text stream is similar to recognizing speech in an acoustic stream, whereby the hidden states are topics and the observations are words or sentences. An alternative to this approach is local context analysis (LCA). In this approach, a database of content-words is consulted for each sentence and associated concepts are returned. Sentences are compared on the basis of common concepts, not shared words. The tracking task is similar to the standard routing and filtering tasks of information retrieval (IR). Each subsequent concept is "matched" to a previous concept using similarity measures.

The present invention proposes a new technique for topic identification based on matching content words in the input stream to nodes in an ontological database. An ontological database is a hierarchically organized lexicon, much like a thesaurus. It contains lexical items classified according to various inter-lexical relationships such as hyponymy/hypernymy (i.e. sub-category/super-category), etonymy/holonymy (part/whole), and synonymy/antonymy. By way of example, the Wordnet ontology can be used for tasks relating to text categorization, machine translation and word-sense disambiguation. The present invention can employ ontologies for topic detection in real-time speech and text translation.

Topic-detection has not previously been though of as a natural candidate for knowledge-based approaches. Ontologies (and other lexical knowledge-bases like the Cycorp™ CyC KB) are lexical hierarchies organized according to a specific set of principles. These principles include classifying words according to sub-classes and super-classes, not topics. Because superclasses do not stand in a topic-subtopic relationship to their subclasses, ontological classes are not considered good topic indicators.

The present invention does not use ontological categories directly as topic indicators. Rather, each content word in the input sequence is associated with a set of both hypemyms (the superclass of the word's class) and holonyms (the whole of which the word represents a part). The resulting set will be used to match a set of possible topics. Overlap in hypemym/holonym sets of subsequent words in an n-gram window will be used as input to a threshold indicator that selects the topic from a pre-defined list.

The advantage the present system is that, unlike statistical topic detectors, the present invention needs very little context to make a topic selection.

In one embodiment, the present invention matches each word (following stop-list processing) to a node in the ontological database. The output of this process is all the hypemym and holonym nodes associated with each word w. The resulting vector $w_1H(j,k)+w_1O(j,k)$ comprises a context-set that is then be matched to a corresponding predefined topic tree. Each node in the topic tree is defined by a similar vector and the two are matched by the type of IR algorithm used in tracking. A set of common hypemrym/holonym links in an n-gram window of input words can be used (instead of matching each single word), but window size would have o be minimized to increase processing speed. With this technique, a minimum of actual context is necessary before a topic is identified.

Context recognition in real-time helps eliminate erroneous word choices by determining which connotation should be selected in the target language in real-time where multiple meanings of words exist in the source language. The word "reservation", for example, may mean Indian reservation, or restaurant reservation or a personal compunction type of reservation. The translation would be accurate only if the context was identified in advance in order to select the correct connotation in the target language's dictionary. Lack of context-sensitivity, through selection of appropriate domain-specific dictionaries with the right connotation, is therefore a major flaw in the current state-of the art of machine translation.

Accuracy of word choice for machine translation in Japanese, Korean, Arabic, Russian, Urdu and Farsi, as well as more common languages such as Spanish and Chinese, can rise dramatically. Rapid prototyping of new machine translation pairs for emergency use, such as Urdu-English, or Bosnian-English, can use customized dictionaries in accordance with the present invention for domain specific dialogues—or dialogues or news feeds or instant messaging in which the topic is changing rapidly and frequently—in real-time, whereas manual selection of dictionaries is not feasible in real-time, particularly where the target language to be translated is not understood by the person manually selecting a topic-specific dictionary.

As shown in FIG. 2, in the context of a speech to speech translation, incoming speech 101 is converted to text by speech-to-text converter 103, which then forwards the text to translation engine 105. After the engine has formatted the text to be translated, the present invention's context recognition tools enable the server to (1) identify the subject matter and automatically select the correct online dictionary so the translation is context-sensitive, and (2) detect the correct language using a statistical algorithm to bring in the right language translation engine corresponding with the source language. Specific lexicons can include telecom, health care and oil and gas industries, for example. In one embodiment, the present invention rapidly changes dictionaries on the fly, without user-assisted menu-driven functions. The language tools needed to achieve such a dramatic increase in accuracy include translation memory, customized dictionaries, summarization and caching memory for enhancing instant messaging.

As shown in FIG. 2, as part of translation gateway 12, translation engine 105 is in communication with topic detection subsystem 106 and specifically a lexicon switching component 107, which is capable of parsing the text through the appropriate dictionary 24 from database 22 based on topic detection as determined by topic lexicon matching component 109. Topic lexicon matching component 109 is capable of matching the topic from the text input with an established lexicon using one or both of statistical topic detection or ontological topic detection. A statistical topic detection component 111 and an ontological topic detection component 113 are provided in communication with topic lexicon matching component 109. It will be appreciated that the components of translation server 18 and topic detection subsystem 106 can be software (e.g., Java™ programs) or hardware elements (e.g., ASICs), or a combination of both software and hardware. The topic detection methods occur as previously discussed. Once the topic is determined, the dictionary selection program can be activated and a domain-specific dictionary will be selected by the lexicon matching component program. The text is then translated and passed to text-to-speech converter 117, whereupon the speech 119 can be spoken using appropriately outfitted devices, such as a cellular telephone, for example.

It will be appreciated that the translation in FIG. 2 can occur without speech inputs and outputs. For example, the text inputs can be obtained via an e-mail message, instant message, SMS message or the like, and outputted in the same manner in which it arrived. Also, while the diagram in FIG. 2 shows one-way data flow, the present invention can operate to provide two-way data flow.

The present invention can be employed in the creation and use of in-house access programs and integration systems. In one embodiment, an off-the-shelf speech-to-text system can be integrated with the translation component of the present invention.

Thus, in one embodiment, the present invention provides a context detection system whose output can be ported to a topic database for topic selection. The topic selection can then be input into a program, which switches domain-specific dictionaries in real time. The domain-specific dictionary is ported seamlessly into the translation engine and a corresponding domain-specific dictionary in the target language is then chosen.

The present invention can be implemented using a plurality of computer programs working sequentially in the following way: (1) the input sequence is processed to remove stop-words (2) each element in the output sequence is matched to nodes in an ontology (or fed to a clustering algorithm in the stochastic topic detection method of the present invention) (3) the resulting list of nodes (either for each word or list of common nodes from an n-gram window) are compared against a Topic Database (4) the topic-activation threshold is calculated (5) a topic is selected, and (6) the lexicon switcher switches lexicons. The ontology or knowledge-base is accessed by a program in accordance with the present invention that matches content words from the input data, producing a term vector as output. Another program uses the output string as input to the program that manages topic-association thresholds.

Dictionary Organization and Selection

As shown in FIGS. 1 and 3, core language dictionaries and a plurality of sublanguage dictionaries are maintained in the system's dictionary database. The system can provide dictionary selection based upon analysis of the text to be translated and other factors, such as the user's prior uses of particular dictionaries in the system. For example, if a particular user seeks to run an Internet search in a foreign language for South American natural gas power plants and seeks related news articles in Spanish, the user is truly seeking two translations in accordance with the present invention. First, the user's keywords must be translated and a search conducted on the translated keywords. Then, the returned web sites and web pages must be translated from Spanish to English so the user can read the articles. The presentation of the request and the returned web page is done in accordance with the methods described elsewhere herein. The selection of the appropriate dictionary to use is critical to the accuracy and ultimate success of the web search or other request made by the user. In one embodiment, the present invention provides a domain specific lexicon builder component which can build new dictionaries and enhance previously established ones through manual input and categorization of terms based on a defined domain.

In the present example, the user's keywords in English "South American natural gas power plants" along with the target language of "Spanish" would be used to locate the most appropriate sub-domain dictionary in the dictionary database. First, the system of the present invention would locate all of the sub-domain dictionaries within the core language pair of English-Spanish. Then, the contextual dictionary locator component would search variations of the phrase "South American natural gas power plants" and through several iterations and variations on the inputted text, the sub-domain dictionary determined to provide the best fit would be accessed to create the Spanish translation. At this point, the search on the Internet would be initiated.

When the Internet search results are returned, the user may desire one or more of the returned references to be translated back into English. In order to do so most accurately, the system of the present invention may incorporate a dictionary or sublanguage dictionary within the Spanish-to-English language pair, such as the Spanish-English energy industry dictionary, or Spanish-English natural gas dictionary, for example. In one embodiment of the invention, the user may be provided with a choice of two or more sub-language dictionaries contained in the dictionary database of the present invention. In a further embodiment of the invention, where the dictionary database does not contain a relevant sub-language dictionary, the core language pair dictionary is employed. Alternatively, the system of the present invention may search the Internet for an appropriate substitute dictionary to be employed to give the greatest contextual accuracy to the translation, as previously described. It will be appreciated that the user may at any time request that an Internet search be performed in order to discover a more contextually proper sub-language dictionary, or in order to invoke a user-known dictionary accessible on the Internet.

The dictionary selection process in the example above may occur as a result of the keywords provided by the user. In the case where the user does not provide keywords, analysis of the text to be translated can be done by words, phrases, proper names, geographic location, or other method of inferring an appropriate sub-dictionary based upon the text or context of the given text to be translated. The ability to determine an appropriate dictionary through context recognition in order to translate text is imperative to any requirement for highly accurate translations. By actively recognizing the context of the text to be translated, the system of the present invention removes the need for the user to select a sub-domain dictionary. In some cases, the user may know which sub-domain or specialized dictionary would be most appropriate, and in such cases the present invention allows the user to so designate. However, in many other cases, the user will be requesting translation of text from a language the user does not understand into a language the user does understand. In such cases, the user is severely disadvantaged in trying to select a specialized dictionary, whereupon the present invention becomes quite valuable to the user.

Incorporation of External Dictionaries

Figure 7:
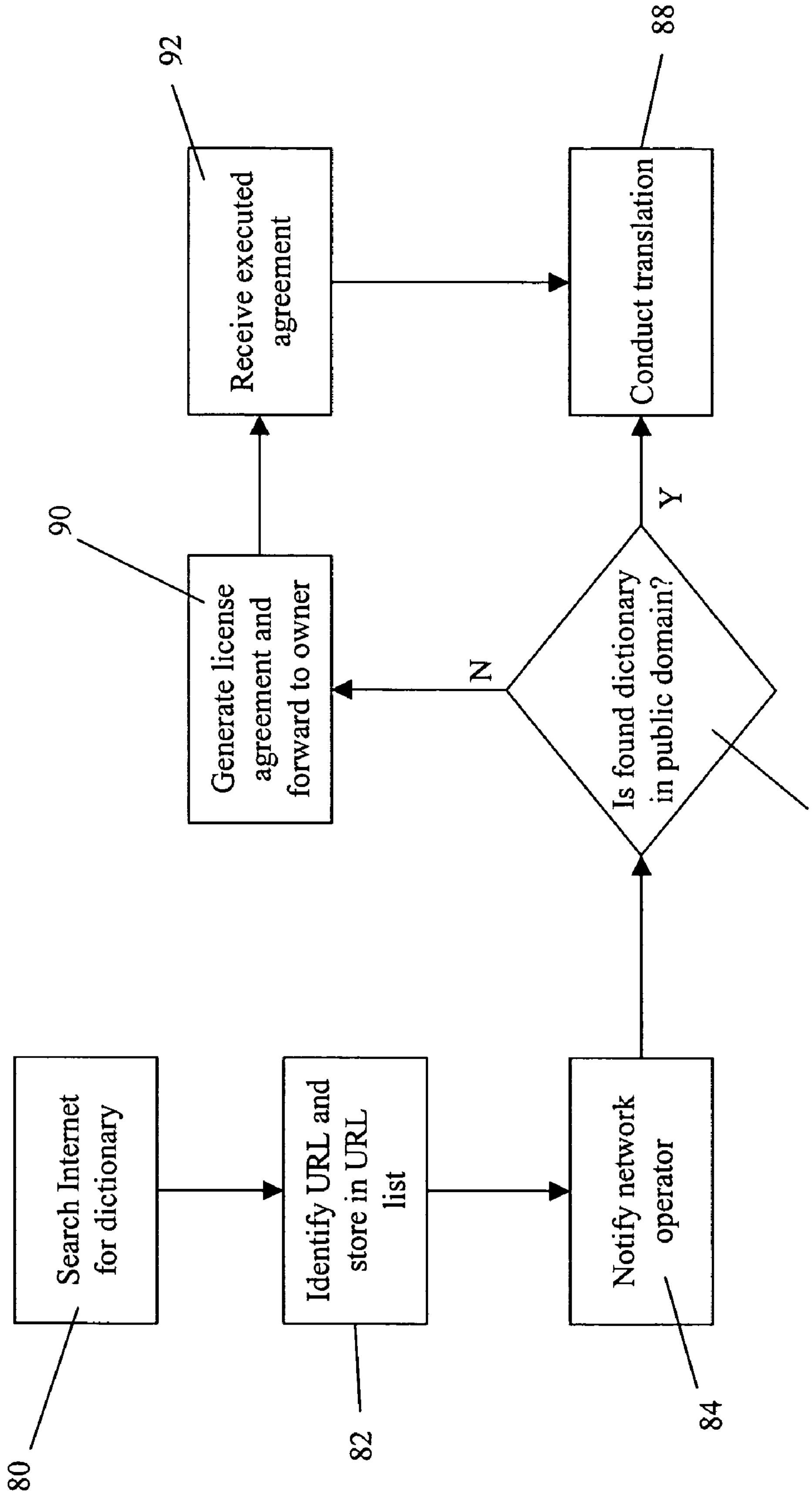
FIG. 7 is a state diagram illustrating a progression of tasks performed during a dictionary search routine and resulting business processes in accordance with one embodiment of the present invention.

As shown in FIG. 7, the system of the present invention can also provide functionality to assist in compensating owners of external specialized or other translation dictionaries. For example, when the system locates a relevant dictionary on the Internet upon searching, as at 80, it identifies the URL (universal resource locator) or address where the dictionary is found, as at 82. This URL can be stored by the system for future analysis and information gathering. Next, a system or network operator in connection with the present system can be notified as at 84 regarding the URL of the found dictionary and any further collected information about the dictionary. The system or the system operator can then determine whether the dictionary is available freely to the public, or whether it is proprietary and not subject to free use, as at 86. If the dictionary is considered in the public domain, the system can conduct the translation of the desired text using the system interface and the translation server, as at 88. If the dictionary is proprietary, the system of the present invention can generate a license agreement and forward it to the owner of the dictionary as at 90, as discovered through conventional means. Once an agreement is in place, as at 92, the system of the present invention can proceed with translations using the dictionary, as previously described.

The system of the present invention can also be used to provide compensation terms as part of any licensed dictionary. Such compensation terms may be determined based upon frequency of need for the dictionary, accuracy of results using the dictionary, and other factors. Further, the system of the present invention can employ methods of electronic payment as known in the art to compensate dictionary owners electronically.

Input Data Reception

The system of the present invention is designed to receive requests in many formats and of many types. In one embodiment, the receiving interface receives input text as electronic machine-readable text over a communications line, or as page image data via a fax/modem board or page scanner. The receiving interface is operated in a computer server along with a recognition module for converting any page image data to electronic text. The recognition module scans and recognizes designations of the input text for determining the selections of the source/target languages and sublanguages applicable to the input text. In the case of electronic text, the input text may be introduced by means of a disk file, by downloading an electronic file, or by online user-system interaction. In a preferred embodiment, the input is interactive, whereby the user is prompted for information concerning user identity, sub-language preferences, source and target languages, and other items to facilitate the translation. Inferencing algorithms may be used to assess the user and textual information and determine the applicable sub-language dictionary or dictionaries.

Figure 4:
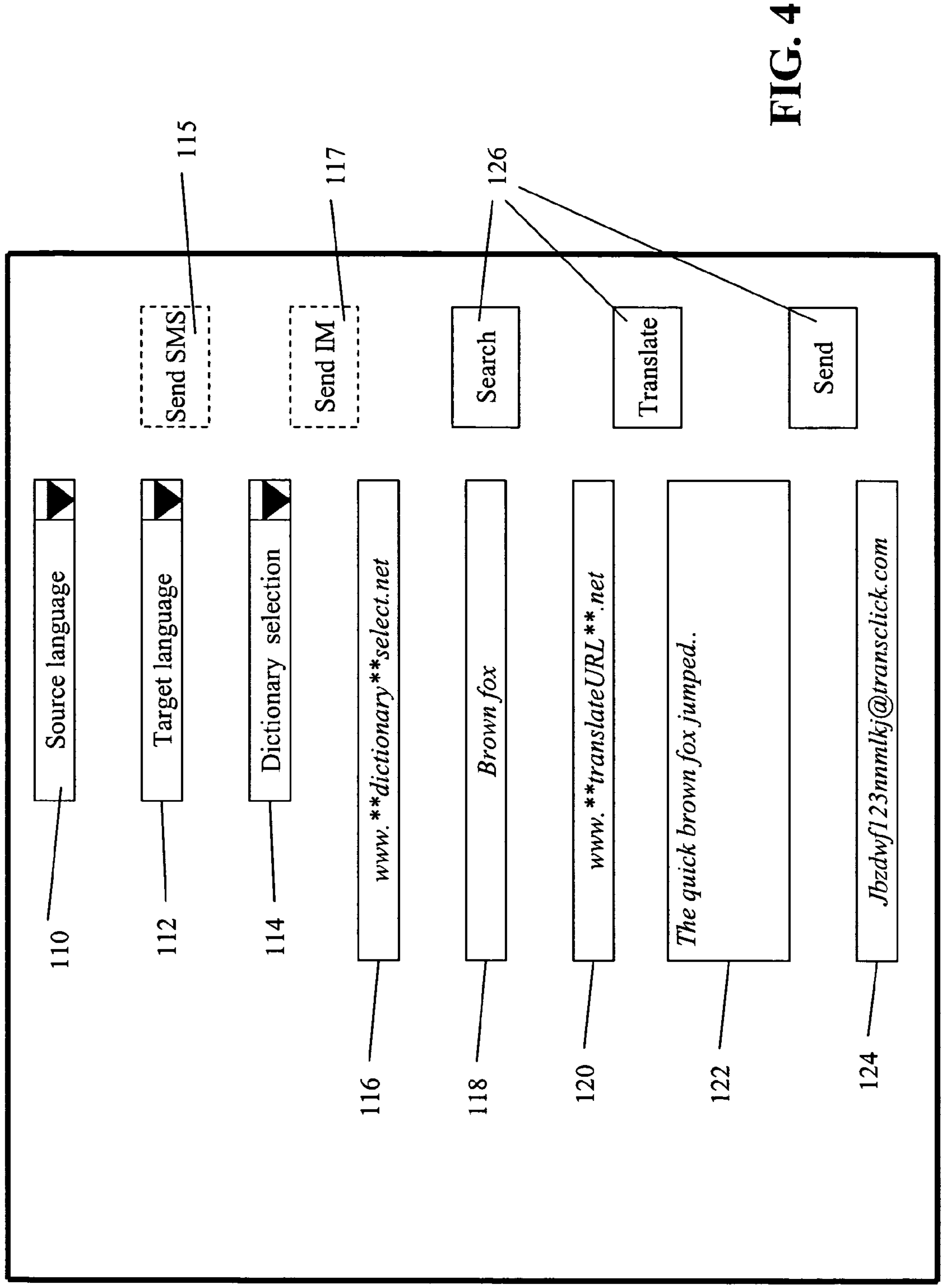
FIG. 4 is an exemplary user interface which may be presented to an end user device in accordance with the present invention.
Figure 5:
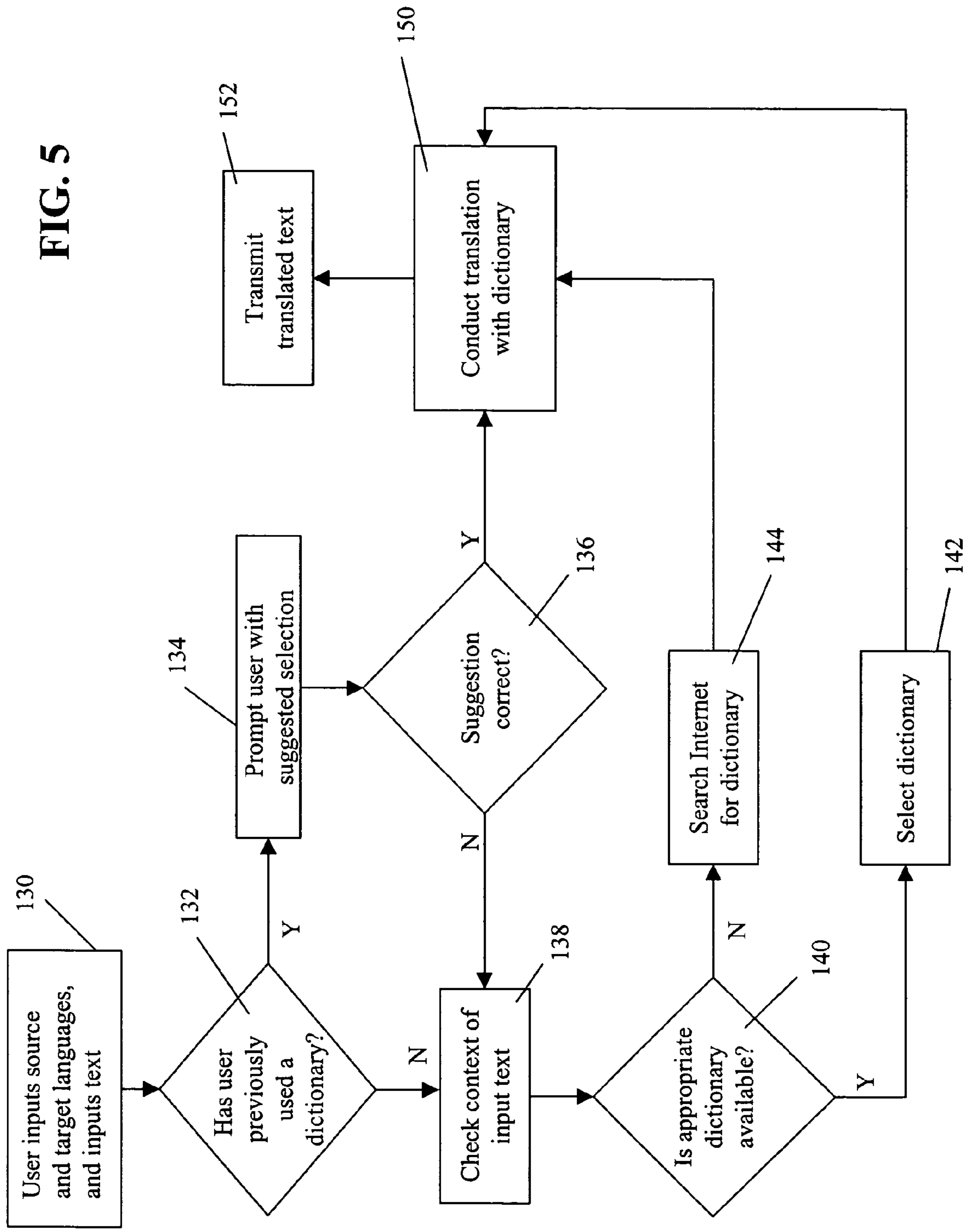
FIG. 5 is a state diagram illustrating a progression of tasks performed during the sending of an electronic mail communication in accordance with one embodiment of the present invention.

FIG. 4 shows an example input screen for use in connection with the present invention. As shown therein, the user may be prompted to provide the source language 110, target language 112, and the text to be translated 122. The user may optionally be prompted to provide a selection of a particular dictionary 114 within the dictionary database, the URL of a known translation dictionary on the Internet 116, keyword search terms 118 for an Internet search, the URL of a web page to be translated 120, if desired, and the e-mail address 124 of an individual who is to receive a translation of the entered text. The items represented in FIG. 5 are not exhaustive of all of the items which may appear on a user's browser for input into the system of the present invention and are provided by way of example. Also, the method by which the user can input the information collected can vary, and can include open text boxes and drop-down menus, for example. Various action buttons 126 can also be provided which enable pre-defined search, translate, and transfer functions upon user input, such as a mouse click, for example, which is widely known in the art.

A user's remote device may have a similar interface to the extent there is available screen space. Otherwise, the remote device may have a portion of the selection options shown in FIG. 4. In one embodiment, a user's remote (e.g., wireless) device may include action buttons and/or selection icons for SMS messaging 115 or instant messaging 117, as shown in dashed lines.

Input requests can include (1) translating and transferring text from the user in the user's language (source language) to the user's desired recipient in the recipient's language (target language); (2) translating and transferring the text of a given web page in a source language to the user in the user's language (target language); (3) translating a document, short message service (SMS) message or e-mail; and (4) searching for information on the Internet where the search is begun using keywords in a first language and translated into a second language, whereupon the search can be conducted effectively in the second language. Each desired function can be executed in accordance with the methods previously described in connection with FIG. 1.

The system of the present invention can be used for many applications requiring or desiring highly accurate language translation functionality. As shown in FIG. 5, for example, the system of the present invention can be used to translate and transfer communications in accordance with a user's preferences. In this example, the system accepts as inputs (step 130) the source and target languages as designated by the user, as well as the text of the communication to be translated. The input text can be an electronic file, text entered by the user through the browser interface, or other form of electronic text as previously described. In one embodiment of the present invention, the system can recognize the source language of the user automatically through character recognition techniques. At step 132, the system can determine whether the user has previously used or stored a dictionary within the system. This may be done through the use of a cookie or other method whereby the system can recognize the identity of the user accessing the system through their Internet browser. This may also be done by the direct input of a user on the graphical user interface available upon accessing the system. If the user has previously used or stored a specialized dictionary, it can be offered to the user as an optional dictionary to be used in translating the user's communication, as at 134. In one embodiment of the invention, the system of the present invention may give added consideration to the particular previously used or stored specialized dictionary or dictionaries in determining the appropriate specialized dictionary to employ for the user's particular request. This may result in a quicker determination by the system of the specialized dictionary to employ, especially as the system of the present invention adds more and more specialized dictionaries.

If the user has not previously used or stored a dictionary, or if the previously used or stored dictionary is determined not to be appropriate as at step 136, the context of the inputted text is analyzed, as at step 138. Based on the contextual analysis of the text to be translated, the system of the present invention checks the dictionary database to determine whether there is an appropriate domain or sub-domain dictionary for the given core language pair and for the context determined to best suit the translation goal of the user, as at 140. If so, the dictionary is selected as at 142 and deployed as at 150, before the translated text is ultimately transferred as at 152 in accordance with the user's original request.

If the appropriate specialized dictionary is determined not to be available within the dictionary database, the system of the present invention can deploy search agents as at 144 to search the Internet for the appropriate specialized dictionary. In one embodiment of the invention, if the dictionary database does not contain the appropriate specialized dictionary, the system of the present invention can translate the desired communication according to a core language pair dictionary available within the dictionary database.

If the search agents locate a suitable specialized dictionary for the given communication context, the system of the present invention can then provide an appropriate interface to allow the translation server in connection with the present invention to translate the desired communication using the located specialized dictionary as at 150. If the located dictionary is found to be satisfactory, such as by repeated use over time or by the measured quality of translation results (which can be measured by human translators), the system of the present invention can act to institute licensing proceedings for the compensation and/or license of the located dictionary from its discovered owner, as described hereinafter.

Multilingual Searching

The progression of processing that occurs during a multilingual search for web pages in accordance with one embodiment of the present invention can occur as follows, with reference to FIG. 1. First, the end user device 20 can transmit keywords via the Internet 14 to the interface server 16. The transmitted keywords are to be used for performing a search for web pages containing and/or relating to the keywords. The end user device 20 may also transmit to the interface server 16 an identifier of a target language in which the user desires to search. The identifier of the target language may specify a single target language or multiple target languages. Next, the interface server 16 passes the user input keywords and the identifier of the target language to the translation server 18. The translation server 18 is capable of converting text from one language to another language. The translation server 18 returns the translated keywords to the interface server 16. As mentioned above, communications between the interface server and the translation server may occur via a direct network connection or via the Internet.

Next, the interface server 16 initiates a query of the search engine database 25 for the locations of web pages which contain and/or relate to the translated keywords. Alternatively, the interface server 16 may pass the translated keywords to a search engine of another service provider (not shown), which may initiate the query of the search engine database 25. Next, the search engine database 25 returns the results of the query to the interface server 16. The search results may include URLs, and titles, abstracts and/or summaries of web pages identified in the search engine database 25 that contain and/or relate to the translated keywords. As is well known in the art, the search results may also include other types of information about each identified web page, such as a creation date, a relevancy score, a file size, etc. Thus, the search results may contain various textual portions written in the target language, making further translation desirable prior to presenting the search results to the end user device 20.

Next, the interface server 16 passes the search results to the translation server 18 for translation to the user's native language. More specifically, the interface server 16 may pass textual portions of the search results to the translation server 18 for translation to the user's native language. Also, the interface server 16 may pass URLs corresponding to web pages identified in the search results to the translation server 18. The translation server 18 may modify URLs so that retrieval of web pages may be directed through the interface server 16, rather than directly through the Internet. Those skilled in the art will appreciate that modification of URLs may be performed at the interface server 16 or at another web server (not shown), instead of at the translation server 18. Furthermore, those skilled in the art should recognize that the scope of the present invention is not meant to be limited by the described configuration, in which interface and translation functions are separated between the exemplary interface server 16 and the exemplary translation server 18. Interface and translation functions may be included within a single gateway web server, or may be divided between any number of inter-connected web servers.

Next, the translation server 18 returns the translated search results to the interface server 16, where they are assembled into a translated results page. The interface server 16 then passes the translated results page to the end user's device, via the Internet. The translated results page may include titles, abstracts, summaries and other information that has been translated into the user's native language, relating to identified web pages. Accordingly, the present invention provides the ability for the user to enter keywords in the user's native language and direct that a search be performed on those keywords in another language, and to receive the search results information summarizing or identifying the uncovered web pages in the user's native language.

Figure 6:
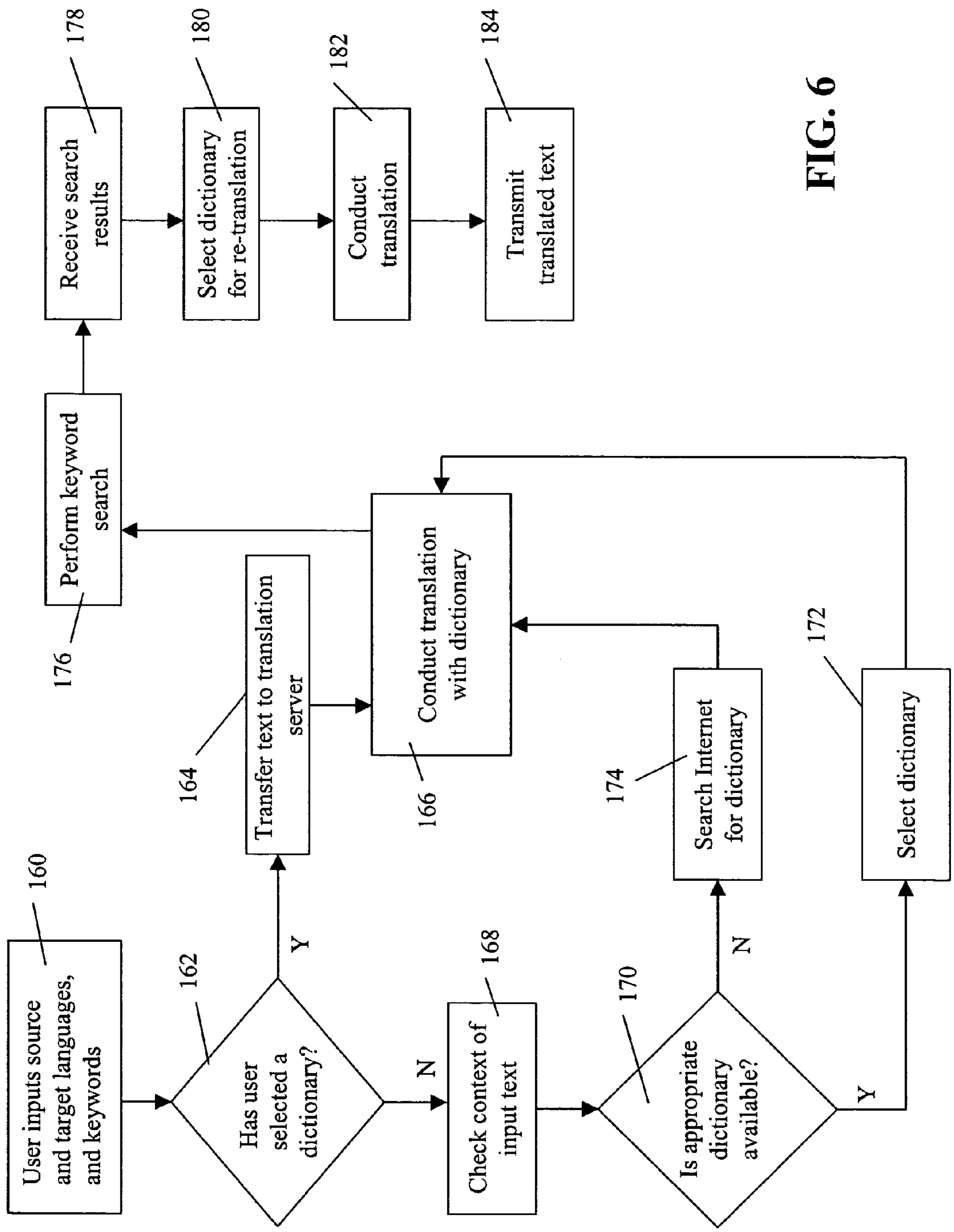
FIG. 6 is a state diagram illustrating a progression of tasks performed during a multilingual search transaction in accordance with one embodiment of the present invention.

FIG. 6 shows a block diagram depicting another method of performing a keyword search in accordance with the present invention. As shown in FIG. 6, once the user has input source and target languages and the keywords to be used in searching (step 160), the system can determine whether the user has also pre-selected a dictionary to be used in translating the keywords or phrase (step 162). If so, the text of the keywords is transferred to the translation server as at 164, and the text is translated accordingly, as at 166. If the user has not pre-selected a dictionary, the system through the translation server analyzes the inputted text to determine which dictionary would be best suited to conduct the translation, as at 168. If a suitable dictionary is available within the database (determined at 170), that dictionary is selected as at 172 and translation is conducted as at 166. If no dictionary in the database is determined to be appropriate, the system of the present invention can perform an Internet search as at 174 using search engine capabilities of the interface server. If a suitable dictionary is found over the Internet, the interface software of the system then allows for the translation server to translate the keyword or key phrase text using the found dictionary as at 166.

Upon performing a keyword search of the Internet, as at 176, using the search engine (25 of FIG. 1), and receiving the search results as at 178, the system of the present invention can then translate the results back into the source language as at 182 using a dictionary selected in a similar manner to the selection of the first dictionary (step 180). The translated results can then be transmitted to the requesting user as at 184.

Multilingual E-mail

The gateway 12 in accordance with the present invention can also be configured for translating and routing e-mail communications (i.e., e-mail messages) between various network elements. The terms "e-mail communication" and "e-mail message" are used synonymously herein. In one embodiment of the present invention, the gateway can be configured to be compatible with existing e-mail client and server software. Therefore, as will be appreciated by one of ordinary skill in the art, a first level of interface for the gateway can be a public SMTP Server. As is generally known within the art, an SMTP server is an integral part of an e-mail system. An SMTP server is responsible for routing e-mail messages between e-mail systems. The public gateway SMTP server is designed to accept e-mail messages from a DNS (domain name server) server and to pass those e-mail messages to a gateway Mail Agent for processing and routing. The combination of the SMTP server and the Mail Agent represents a specially configured gateway interface server 16. The gateway Mail Agent may be operable to extract textual portions from an e-mail message and to send those extracted textual portions to the translation server 18. Alternately, functionality for extracting textual portions from an e-mail message may be included in the translation server 18. In one embodiment of the invention, the translation server 18 may be comprised of one or more machine translation engines.

In an exemplary embodiment, the translated e-mail services of the present invention may be integrated with an existing e-mail system, such that an interface server 16 is used as a gateway into the existing e-mail system. For example, if all users of an existing e-mail system are to be offered translating service, an exemplary embodiment may encapsulate the existing e-mail system. In such a configuration, those skilled in the art will appreciate that providing users with access to the interface server 16 may be accomplished by updating a DNS server to point SMTP domain name(s) to the gateway SMTP server. Alternately, if the goal is to enable a premium translating service for providing translating services to only selected users, an exemplary embodiment may be configured to supplement existing e-mail systems. To supplement existing e-mail systems, users may be given the option to update their client software to point to the domain name assigned to the gateway SMTP server. For example, an ISP may want to offer translated e-mail as a premium service for users. If a pre-existing SMTP server is located at smtp.myisp.com, the ISP may define a new domain name, such as newsmtp.myisp.com, corresponding to the gateway SMTP server and then direct all premium users to the new address. Of course, the reverse approach is also possible, wherein the preexisting SMTP server is assigned a new SMTP domain name.

Key contributing factors to implementing an embodiment of the present invention wherein translated e-mail services are offered via gateway into existing e-mail systems may be: a desire to maintain existing e-mail infrastructure; the ability to offer mixed services, i.e. "traditional" and "translated" e-mail; a desire to maintain existing internal client base software; and a desire to maintain external access (i.e., addresses). In cases where an existing e-mail infrastructure is tightly integrated with other services or policies, a gateway configuration such as provided by the present invention may add the desired translation capabilities while maintaining the existing e-mail infrastructure. A gateway configuration may also prove critical for speed of implementation and cost of services.

Some e-mail installations may desire to maintain their existing client base software, such as e-mail client utility, address books and history folders. In addition, client settings may be difficult to update. As such, the client software may be seamlessly integrated into a gateway configuration of the present invention. For example, the server side DNS may be updated to point to new IP address(es) assigned to gateway SMTP server(s). Also, the gateway SMTP servers may be assigned to the IP addresses of pre-existing SMTP servers, which in turn may be assigned new addresses. Another important factor considered by the present invention is the desire to maintain the external address space assigned to the existing internal users. For example, if the users of the system have mailboxes on myisp.com, such as someuser@myisp.com, it may be desirable and practical to maintain this schema. A gateway configuration allows external address space to be easily maintained.

From a reading of the description above pertaining to the disclosed embodiments of the present invention, modifications and variations thereto may become apparent to those skilled in the art. For instance, the gateway of the present invention may also be adapted to interact with "chat room" application programs to multilingual "chatting" over a distributed network. Also, the translation component of the present invention may be adapted to simultaneously or individually handle all types of communications described herein. Other alternatives and variations may also become apparent to those of ordinary skill in the art upon a close examination of this specification in view of the drawings.

Multilingual SMS

Short message service (SMS) is a globally accepted wireless service that enables mobile subscribers to transmit alphanumeric (e.g., text) messages using a wireless handset and/or cellular telephone. Transmissions can occur between mobile subscribers and external systems such as electronic mail, paging, and voice-mail systems. The messages are generally no more than 140–160 characters in length. Similar to e-mail, short messages are stored and forwarded at SMS centers (SMSCs), which means messages can be retrieved later if the recipient is not immediately available to receive them. SMS messages travel to the cell phone over the system's control channel, which is separate and apart from the voice channel. The North American protocol for passing cellular subscriber information from one carrier to another is International Standard 41, or IS-41, which supports short messages.

Short codes can be used as part of an SMS system. Essentially a direct response medium, short codes let people send SMS messages simply by dialing a four, five, or six-digit number, rather than the 10-digit numbers used in person-to-person text-messaging. Short codes are easier to remember and easier to type than their longer counterparts, and let users send a short, easy code in response to a promotion makes it more likely that they will engage with the campaign. These numbers are of interest to carriers because they can be billed at varying rates. They are of interest to marketers because they represent an easy way for consumers to use their mobile phones to respond to promotions and to ask for content, including call-to-action campaigns in print ads or on billboards, or text voting for TV viewers.

Figure 8:
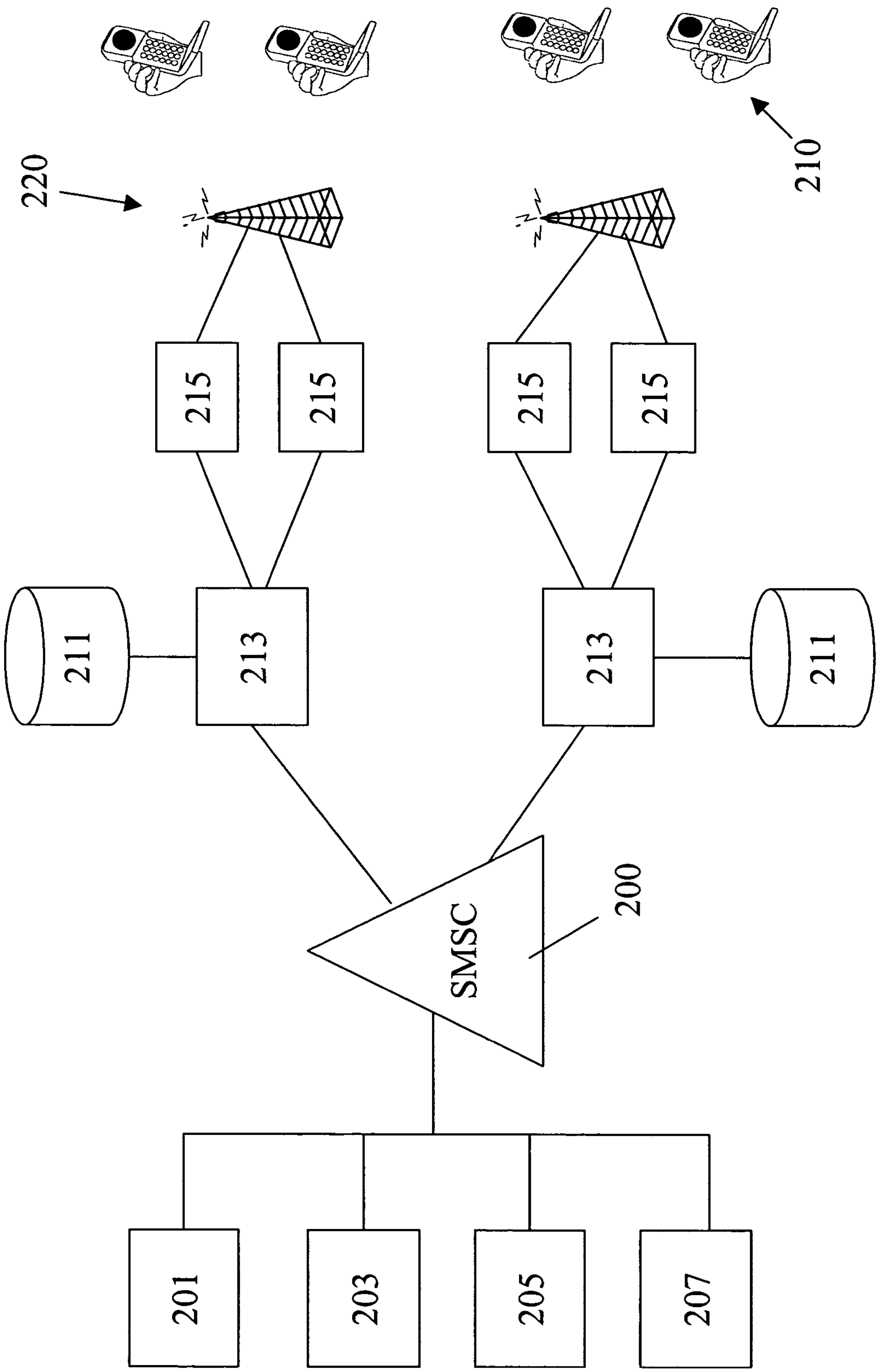
FIG. 8 is a diagram of a short message service (SMS) network for use in accordance with one aspect of the present invention.

FIG. 8 shows an example network architecture for an IS-41 SMSC deployment handling multiple input sources, including a voice-mail system 201, Web-based messaging 203, e-mail integration 205, and other external short message entities 207. It will be appreciated that a functionally similar SMS architecture could also be employed in other wireless networks, such as a global system for mobile communications (GSM) wireless network. The signal transfer point 213 allows for communication with the wireless network elements such as the home location register 211 and mobile switching center 215.

As shown in FIG. 8, the SMSC 200 acts as a store-and-forward system for short messages. The SMSC 200 is a combination of hardware and software responsible for the relaying and storing and forwarding of a short message between any of the short message entities 201, 203, 205, 207 and mobile device 210. With SMS, an active mobile handset 210 is able to receive or submit a short message at any time via air interface 220, independent of whether a voice or data call is in progress (in some implementations, this may depend on the mobile switching center or SMSC capabilities). SMS also guarantees delivery of the short message by the network. Temporary failures due to unavailable receiving stations are identified, and the short message is stored in the SMSC until the destination device becomes available.

Devices 201, 203, 205 and 207 can receive or send short messages. It will be appreciated that the short message entity (SME) may be located in the fixed network, a mobile device, or another service center. In a typical SMS environment, the voice mail system 201 is responsible for receiving, storing, and playing voice messages intended for a subscriber that was busy or not available to take a voice call. It is also responsible for sending voice-mail notifications for those subscribers to the SMSC 200. World Wide Web 203 interconnections are also supported for the submission of messages and notifications. SMS also provides the ability to deliver e-mail notifications and to support two-way e-mail, using an SMS-compliant terminal. The SMSC must support interconnection to e-mail servers (e.g., 205) acting as message input/output mechanisms.

The signal transfer point 213 is a network element typically available on IN deployments that allows IS-41 interconnections over signaling system 7 (SS7) links with multiple network elements. SS7 is a telecommunications industry standard signaling protocol. SMS service makes use of the SS7 mobile application part (MAP), which defines the methods and mechanisms of signaling communication in mobile or wireless networks. The MAP protocol uses the transaction capabilities application part (TCAP) component of the SS7 protocol, and both North American and international standards bodies have defined a MAP layer using the services of the SS7 TCAP component.

The home location register (HLR) 211 is a database platform for permanently storing and managing mobile service subscriptions, user profiles and user location information for users belonging to the same network as the HLR. A visitor location register (VLR) is a database element used to temporarily store information about subscribers who are currently roaming in the area serviced by that VLR. This information is needed by the mobile switching center (MSC) 215 to service visiting subscribers. The VLR can belong to the subscriber's home network or to a non-home network. In many cases, VLR databases are integrated within mobile switching center network elements. The HLR and VLR store information for properly routing voice calls or data communications to the mobile user. This can include international mobile station identification (IMSI), mobile identification number (MIN), mobile directory number (MDN), and mobile station international ISDN number (MSISDN), as well as VLR and mobile switching center identification information associated with the user.

The mobile switching center 215 performs the switching functions of the system and controls calls to and from other telephone and data systems. The MSC delivers the short message to the identified user through the proper base station. The air interface 220 is defined based on the given wireless technologies (e.g., GSM, TDMA, and CDMA), which specify how the voice or data signals are transferred from the MSC to the handset and back. These technologies also specify the utilization of transmission frequencies, considering the available bandwidth and the system's capacity constraints.

The HLR 211 provides the routing information for the indicated user, as prompted by the SMSC 200. If the destination station was not available when the message delivery was attempted, the HLR 211 informs the SMSC 200 that the station is now recognized by the mobile network to be accessible, and thus the message can be delivered.

In providing an automatic translation of SMS messages, the present invention can parse the SMS message, filter abbreviations, interpret the delivered message, screen the call identification information and establish an appropriate language pair for translation.

Figure 9:
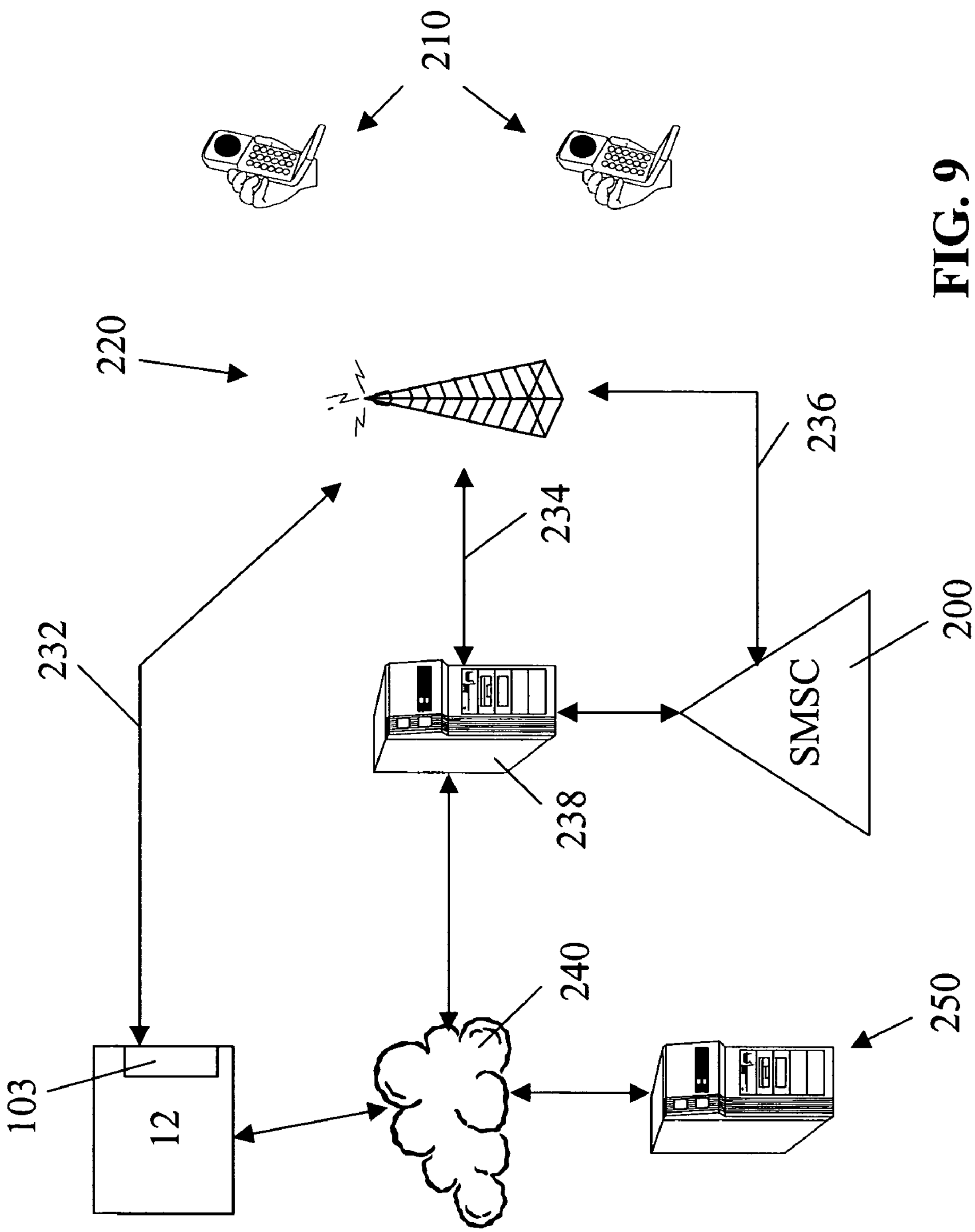
FIG. 9 is a sample schematic showing one environment in which the system of the present invention may be employed.

A block diagram of a communication and translation system 300 according to one embodiment of the present invention is shown in FIG. 9. As shown therein, mobile devices 210 receive phone calls through a voice communication channel 232 and hypermedia information from remote server devices through broad-band 234 and narrow-band 236 (e.g. SMS) data communication channels which can include wireless gateway 238 and SMSC 200. Mobile devices can be devices taken from the group of devices including mobile phones, personal digital assistants and/or palm sized computing devices with voice and data transmission and/or reception capabilities. Hypermedia can include media from the group including Extensible Markup Language (XML) documents, Hyper Text Markup Language (HTML) documents, Compact Hypertext Transport Protocol (cHTML) documents, Handheld Device Markup Language (HDML) documents, Wireless Markup Language (WML) documents, or other similar data types.

Mobile devices 210 are provided with a display, user interface and appropriate software stored within memory for processing received hypermedia information, and can be coupled to server 238 through wireless network 220. Mobile devices 210 can also be provided with speakers and microphones for transmitting and receiving audible communications. Wireless network 220 can be one of the wireless communication networks known in the art, such as, for example, a cellular digital packet data (CDPD) network, a GSM network, IS-41 network, Code Division Multiple Access (CDMA) network, or Time Division Multiple Access (TDMA). Wireless network 220 can use various communication protocols such as, for example, Wireless Access Protocol (WAP) or Handheld Device Transport Protocol (HDTP). Wireless gateway 238 is further coupled to a separate network 240 and network 240 is coupled to translation gateway 12 and, in the embodiment of FIG. 9, a networked server farm 250.

The mobile device user can access the voice communication channel 232 once the device is recognized by the network 220, such as through the exchange of identification information between the mobile device and network 220. Device and/or user identification information can be stored in the memory of the device and transmitted automatically when the user attempts to access the network, as is known in the art.

Translation gateway 12 includes the capabilities described above and an appropriate speech-to-text converter 103 can be provided at the voice communication channel interface to the translation gateway 12. Server farm 250 can provide access to hypermedia information including information to be sent to mobile devices 210.

Both wideband and narrowband data communication channels can receive from and deliver data to mobile devices.

A mobile device user desiring to send a translated message to another user according to the present invention can do so by voice or text. If doing so by voice, user first establishes a voice channel as shown at 232. Once a voice channel is established, speech is received by the speech-to-text converter and processing occurs as described above. If doing so by text, whether by broadband or narrowband communication, the user submits the text through device 210 and hits the "submit" or other appropriate button on the device. If the user is pre-selecting the language pair for translation, the user can so specify as described in connection with the user interface in FIG. 4. If the user's text or speech is to be analyzed for topic detection and/or context recognition, similar procedures to those defined earlier will occur at translation server 18.

Thus, it can be seen that users of mobile devices 210 in accordance with the present invention can access language translation services without the significant hardware or software modifications that might be required if the translation services were executed by the device itself. Additionally, since the software performing translation processing is resident on an accessible remote server device with superior processing speed and large storage capacity, the user of the device can be provided with the functionality and resources associated with a full featured speech translation application, including access to large language dictionaries, selectable language dictionaries for multiple languages and user specific files (e.g. voice templates and user customized dictionaries and lists). It will be appreciated that the present invention is operable regardless of device or device operating system. For example, mobile devices 210 can operate using various operating systems such as Java 2 Micro Edition (J2ME™), Binary Runtime Environment for Wireless (BREW™) by Qualcomm™, Symbian™, Linux™, Palm™, .Net, and the RIM Blackberry™ operating system.

In one embodiment, the user's source language and the intended recipient's target language are automatically determined based on information detected in the message sending process. Respective sending and receiving party identification information can be detected in a variety of ways. Detection can occur automatically based on the device used or based on the sent message. For example, the sender's device can be recognized by the network 220 and an associated cellular telephone number can be detected and compared to a previously established database of telephone numbers. Since the beginning portion of the telephone number typically includes an indication of the country or area code associated with the device's phone number, the present invention can use this code to associate a language dictionary with the intended translation. For example, the user's telephone may be registered in the United States with a "202" area code, which would mean the user's telephone is associated with the Washington, D.C. region of the United States. Thus, the user's language would be pre-established as English.

This method can be employed based on the recipient's phone information as well. For example, if the user intends to send an SMS message to Japan, the user would employ the country code "81". Once this information is detected, the present invention can compare the identification information with previously stored identification information from translation database 24, and can then select the English-Japanese translation dictionary to translate the user's message from English to Japanese automatically and in real-time. The text of the message can also be analyzed for topic detection and context recognition as described above to obtain the appropriate contextual English-Japanese dictionary for translation, as described above. If the present invention detects a topic change within the SMS message, multiple dictionaries may be employed "on the fly" to provide the most accurate complete message translation from English to Japanese, in this example.

In another embodiment, the present invention can detect the international direct dialing prefix used by the sender. For example, if the sender uses the international dialing prefix "011", the system can detect that the user is dialing from the United States and can again choose English as a default source language for the impending translation. In still a further embodiment, the sender's or the recipient's language for translation can be determined based on either's mobile subscriber integrated services digital network (MSISDN) number, international mobile station identifier (IMSI) number, electronic mail (email) address, or Internet protocol (IP) address. Such items may be pre-associated with a given language to assist in the automatic determination of which language pair to employ for a given SMS message to be translated.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A system for translating text from a source language to a target language, comprising:

an input component for receiving a request to translate text, said request including at least a target language designation, and input text to be translated;

a plurality of first-type translation dictionaries including at least one core language dictionary and a plurality of sub-language dictionaries, said first-type dictionaries being maintained within a system dictionary database;

a dictionary search component capable of searching a non-system resource separate from said system dictionary database for at least one second-type translation dictionary, and storing a resource locator indicative of an electronic address for said at least one second-type translation dictionary;

a dictionary selection component in communication with sad input component and said first-type and second-type translation dictionaries for selecting one of said dictionaries based upon said input text;

an interface component for communicating said input text to said second-type translation dictionary for translation by said translation component upon said selection component selecting said second-type dictionary; and a translation component for translating said input text from said source language into said target language using said selected dictionary.

2. The system of claim 1 further including a transmission component for transmitting said translated text to a designated recipient.

3. The system of claim 1 further including a user storage component for storing at least one user-specified dictionary and a user history, said history including an identification of said selected dictionary.

4. The system of claim 1 further including a determination component for determining whether said second-type dictionary is in the public domain and, if not, generating a licensing agreement pertinent to the use of said second-type dictionary.

5. The system of claim 1 wherein said plurality of first-type dictionaries are stored in a dictionary database.

6. The system of claim 1 further including a dictionary population interface for allowing the modification of at least one of said plurality of first-type dictionaries.

7. The system of claim 6 wherein said dictionary populating interface includes a security component having functionality for limiting access to said dictionary populating interface.

8. The system of claim 1 wherein said dictionary selection component searches said plurality of dictionaries using individual words from said received text.

9. The method of claim 1 wherein said dictionary selection component searches said plurality of dictionaries using individual phrases from said received text.

10. The method of claim 1 wherein said dictionary selection component searches said plurality of dictionaries using proper names from said received text.

11. The system of claim 1 wherein said input component can receive a request for document translation of text into said target language.

12. The system of claim 1 wherein said input component can receive a specification of which sub-dictionary to use.

13. The system of claim 1 wherein said plurality of first-type dictionaries includes at least one user-specified dictionary.

14. The system of claim 1 wherein said input text is communicated in a form taken from the group consisting of: e-mail, fax, SMS message, instant message, voice, electronic document.

15. The system of claim 1 wherein said system further includes a notification component for notifying a system operator of the public domain status of a second-type dictionary.

16. The system of claim 1 wherein said plurality of sub-language dictionaries are language-dependent.

17. The system of claim 1 including a source language identification component for recognizing the source language of the input text.

18. A method for translating and communicating text, comprising:

- receiving input text to be translated, along with at least one target language designation;
- providing a plurality of first-type translation dictionaries including at least one core language dictionary and a plurality of sub-language dictionaries, said first-type dictionaries being maintained within a system dictionary database;
- providing a search component capable of searching a non-system resource separate from said system dictionary database for at least one second-type translation dictionary, and storing a resource locator indicative of an electronic address for said at least one second-type translation dictionary;
- searching said first and second-type dictionaries and selecting one of said dictionaries to be used in translating said input text, said selection being made based upon said input text;
- providing an interface component for communicating said input text to said second-type translation dictionary for translation upon said selection being of said second-type dictionary; and
- translating said input text into said target language using said selected dictionary.

19. The method of claim 18 further including the step of providing a user storage component for storing at least one user-specified dictionary and a user history, said history including an identification of said selected dictionary.

20. The method of claim 18 further including the step of providing a determination component for determining whether said second-type dictionary is in the public domain and, if not, generating a licensing agreement pertinent to the use of said second-type dictionary.

21. The method of claim 18 including the step of providing a dictionary database for the storage of said plurality of first-type dictionaries.

22. The method of claim 18 further including the step of providing a dictionary population interface for allowing the modification of at least one of said plurality of first-type dictionaries.

23. The method of claim 22 including the step of providing a security component to said dictionary populating interface for limiting access to said dictionary populating interface.

24. The method of claim 18 wherein said step of selecting a dictionary includes the step of searching said plurality of dictionaries using individual words from said received text.

25. The method of claim 18 wherein said step of selecting a dictionary includes the step of searching said plurality of dictionaries using individual phrases from said received text.

26. The method of claim 18 wherein said step of selecting a dictionary includes the step of searching said plurality of dictionaries using proper names from said received text.

27. The method of claim 18 wherein said step of receiving input includes receiving a request for document translation of text into said at least one target language.

28. The method of claim 18 wherein said step of receiving input includes receiving a specification of which sub-dictionary to use.

29. The method of claim 18 wherein the step of providing a plurality of first-type dictionaries includes providing at least one user-specified dictionary.

30. The method of claim 18 wherein the step of receiving input text includes receiving said text in a form taken from the group consisting of: e-mail, fax, instant message, voice, electronic document.

31. The method of claim 18 further including the step of providing a notification component for notifying a system operator of the public domain status of a second-type dictionary.

32. The method of claim 18 wherein the step of providing a plurality of sub-language dictionaries includes providing language-dependent sub-language dictionaries.

33. The method of claim 18 further including the step of transmitting said translated text to a designated recipient.

34. A system for translating text from a source language to a target language in a computer network having a plurality of users, comprising:

- means for receiving input text and at least one target language designation;
- means for storing a translation dictionary database, including core language dictionaries, sub-language dictionaries, and user-specific dictionaries;
- means for searching said network for translation dictionaries not maintained within said dictionary database, and storing a resource locator indicative of an electronic address for any found translation dictionaries not maintained within said dictionary database;
- means for providing an interface for communicating with said translation dictionaries not maintained within said dictionary database;
- means for providing an interface for populating dictionaries;
- means for selecting one of said dictionaries based upon said input text, said selecting means selecting from said core language dictionaries, said sub-language dictionaries, said user-specific dictionaries and said translation dictionaries not within said dictionary database;
- means for translating said input text using said selected one of said dictionaries; and
- means for delivering translated text to a desired one of said users.

35. A system for translating a communication between a first network element and a second network element in a computer network, the communication having a textual portion presented in a first language, the system comprising:

a translation server for translating the textual portion of the communication from the first language to a second language to create a translated communication;

an interface server for receiving the communication via the network before it reaches the second network element, passing the communication to the translation server, receiving the translated communication from the translation server, and transmitting the translated communication to the second network element via the computer network, said interface server being capable of receiving an input element, said input element designating the communication to be translated and designating said second language;

a dictionary storage component for storing first-type translation dictionaries including at least one core language dictionary and a plurality of sub-language dictionaries;

a dictionary search component capable of searching a resource separate from said dictionary storage component for at least one second-type translation dictionary, and storing a resource locator indicative of an electronic address for said at least one second-type translation dictionary; and a dictionary selection component for selecting at least one of said dictionaries based upon said communication to be translated.

* * * * *